United States Patent
Nanba et al.

(10) Patent No.: US 10,161,297 B2
(45) Date of Patent: Dec. 25, 2018

(54) HEAT-INSULATING STRUCTURE OF MEMBER FACING ENGINE COMBUSTION CHAMBER, AND PROCESS FOR PRODUCING SAME

(71) Applicant: MAZDA MOTOR CORPORATION, Hiroshima (JP)

(72) Inventors: Satoshi Nanba, Higashi-Hiroshima (JP); Shinji Kadoshima, Kaita-chou (JP); Daiji Katsura, Etajima (JP); Nobuo Sakate, Fuchu-chou (JP); Takakazu Yamane, Hiroshima (JP); Akihide Takami, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 637 days.

(21) Appl. No.: 14/419,118

(22) PCT Filed: Jul. 24, 2013

(86) PCT No.: PCT/JP2013/004519
§ 371 (c)(1),
(2) Date: Feb. 2, 2015

(87) PCT Pub. No.: WO2014/030297
PCT Pub. Date: Feb. 27, 2014

(65) Prior Publication Data
US 2015/0204233 A1    Jul. 23, 2015

(30) Foreign Application Priority Data
Aug. 23, 2012 (JP) .................. 2012-184510

(51) Int. Cl.
*F02B 75/08*     (2006.01)
*F02B 23/08*     (2006.01)
(Continued)

(52) U.S. Cl.
CPC .......... *F02B 23/08* (2013.01); *C23C 18/1831* (2013.01); *C23C 18/31* (2013.01);
(Continued)

(58) Field of Classification Search
USPC .......................................... 123/668; 427/302
See application file for complete search history.

(56) References Cited

U.S. PATENT DOCUMENTS

2008/0213486 A1   9/2008   Ronk et al.
2010/0317774 A1*   12/2010   Sugioka .................... C07F 7/21
                                                                                   524/89
(Continued)

FOREIGN PATENT DOCUMENTS

JP    2000-007786 A    1/2000
JP    2000-043758 A    2/2000
(Continued)

OTHER PUBLICATIONS

Machine Translation of JP2012072746A PDF File Name: "JP2012072746A_Machine_Translation.pdf".*
(Continued)

*Primary Examiner* — Lindsay Low
*Assistant Examiner* — Ruben Picon-Feliciano
(74) *Attorney, Agent, or Firm* — Studebaker & Brackett PC

(57) ABSTRACT

A heat-insulating layer exhibiting high resistance to cracks, peeling, deformation, and gasoline and high heat insulation is obtained on the wall surface of an engine member (19). First, a heat insulator layer including a silicone-based resin and hollow particles containing a Si-based oxide is formed on a wall surface of the engine member (19). Then, Si-based oxide is produced through oxidation of a silicone-based resin in at least part of the surface of the heat insulator layer by heating the surface of the heat insulator layer. Thereafter, (Continued)

a catalytic metal is added to the silicone-based resin in the surface of the heat insulator layer and/or Si-based oxide derived from the hollow particles. Using the catalytic metal as nuclei, electroless plating is performed. In this manner, a heat-insulating layer (21) in which the surface of the heat-insulating film (27) is covered with a plating film (29) is obtained.

11 Claims, 5 Drawing Sheets

(51) Int. Cl.
    *F02F 1/18*     (2006.01)
    *F02F 3/10*     (2006.01)
    *F02B 77/11*     (2006.01)
    *C23C 18/18*     (2006.01)
    *C23C 18/31*     (2006.01)

(52) U.S. Cl.
    CPC ................ *F02B 77/11* (2013.01); *F02F 1/18* (2013.01); *F02F 3/10* (2013.01); *F05C 2251/048* (2013.01)

(56) References Cited

U.S. PATENT DOCUMENTS

2010/0319647 A1    12/2010    Ogawa et al.
2011/0281138 A1    11/2011    Yoshioka et al.
2012/0028055 A1    2/2012    Schmidt
2012/0082841 A1    4/2012    Kadoshima et al.

FOREIGN PATENT DOCUMENTS

| | | | |
|---|---|---|---|
| JP | 2000-334881 A | | 12/2000 |
| JP | 2009-088256 A | | 4/2009 |
| JP | 2009-131727 A | | 6/2009 |
| JP | 2009-243352 A | | 10/2009 |
| JP | 2009243352 A | * | 10/2009 |
| JP | 2010-070792 A | | 4/2010 |
| JP | 2012-002073 A | | 1/2012 |
| JP | 2012-061559 A | | 3/2012 |
| JP | 2012061559 A | * | 3/2012 |
| JP | 2012-072746 A | | 4/2012 |
| JP | 2012072746 A | * | 4/2012 |
| WO | 89/03930 A1 | | 5/1989 |
| WO | 2009/069703 A1 | | 6/2009 |
| WO | 2010/087336 A1 | | 8/2010 |

OTHER PUBLICATIONS

Machine Translation of JP2009243352A PDF File Name: "JP2009243352A_Machine_Translation.pdf".*
Machine Translation of JP2012061559A PDF File Name: "JP2012061559A_Machine_Translation.pdf".*
International Search Report; PCT/JP2013/004519; dated Sep. 17, 2013.

* cited by examiner

HEAT-INSULATING STRUCTURE OF MEMBER FACING ENGINE COMBUSTION CHAMBER, AND PROCESS FOR PRODUCING SAME

TECHNICAL FIELD

The present invention relates to a heat-insulating structure of a member facing an engine combustion chamber and a method for producing the structure.

BACKGROUND ART

As a method for increasing a thermal efficiency of an engine, the technique of providing a heat-insulating layer on a surface facing a combustion chamber of an engine was proposed in the 1980s (see, for example, Patent Document 1). Since then, a heat-insulating layer of a ceramic sintered body and a heat-insulating layer of a flame-sprayed layer containing $ZrO_2$ particles showing low thermal conductivity have been proposed.

In application as a heat-insulating layer, however, the ceramic sintered body was faced with the problem of occurrence of cracks and peeling in the heat-insulating layer due to thermal stress or thermal impact. Thus, the ceramic sintered body has not been put into practical use especially for a heat-insulating layer in a relatively large portion such as a top face of a piston, an inner peripheral surface of a cylinder liner, and a lower face of a cylinder head.

On the other hand, the flame-sprayed layer itself once was used for a cylinder liner and a trochoid surface of a rotary engine. This use, however, was intended to increase the abrasion resistance, and was not intended to increase heat insulation. To use the flame-sprayed layer as a heat-insulating layer, a low-thermal-conduction material containing zirconia ($ZrO_2$) as a main component is preferably flame sprayed. However, adhesion among particles in a zirconia-based layer is inferior to that of a cermet-based layer, and cracks easily occur due to, for example, thermal stress and fatigue caused by repetitive mechanical stress.

On the other hand, Patent Document 2 proposes that a heat-insulating thin film composed of a particulate first heat insulator and a film-shape second heat insulator is provided in a member facing a combustion chamber of an engine. Patent Document 2 shows that the second heat insulator has the function of bonding the first heat insulator, ceramic such as zirconia ($ZrO_2$), silicon, titanium, or zirconium, ceramic containing carbon and oxygen as main components, or ceramic fibers having high strength and high thermal resistance is used as a second heat insulator, and the second heat insulator is applied as a coating or bonded onto a base material.

Patent Document 3 shows a technique for forming a heat-insulating thin film on a member facing an engine combustion chamber. In this technique, a thin film is formed on a combustion chamber wall surface of the member by applying a mixture of an organic silicon compound and large number of resin grains and heating the thin film so as to form a large number of bubbles in the member. Specifically, the thin film is heated to a temperature of 600 to 800° C. or more, thereby gasifying the resin grains. In addition, a gas generated by thermal decomposition of the organic composition is purged from the thin film, and the thin film after the gas purge is heated to a higher temperature (1000 to 1200° C. or more). In this manner, a silicon compound ($SiO_2$ and SiC) generated by the thermal decomposition of the organic silicon compound is sintered.

CITATION LIST

Patent Document

[Patent Document 1] International Patent Publication No. WO 89/03930
[Patent Document 2] Japanese Unexamined Patent Publication No. 2009-243352
[Patent Document 3] Japanese Unexamined Patent Publication No. 2010-70792

SUMMARY OF THE INVENTION

Technical Problem

Patent Document 2 merely describes a technique of applying, as a coating or bonding a second heat insulator onto a base material, and does not specifically describe how a heat-insulating thin film thereof is obtained. In view of using a ceramic material as a second heat insulator, the heat-insulating thin film thereof is supposed to be a type of a ceramic sintered body. Patent Document 2 fails to disclose measures for preventing deformation and generation of cracks due to, for example, combustion pressure. In the technique of Patent Document 3, the resulting heat-insulating thin film is also supposed to be a type of a ceramic sintered body, and does not serve as measures for preventing deformation and generation of cracks due to, for example, combustion pressure.

In particular, a member facing an engine combustion chamber has been partially made of an aluminum alloy in recent years, and a ceramic-based heat-insulating thin film has a conspicuous problem of cracks and peeling as described above because of a large difference in coefficient of thermal expansion between the aluminum alloy member and the heat-insulating thin film. With occurrence of such cracks, even if the heat-insulating thin film is not peeled off, fuel from a fuel injection valve of the engine is disadvantageously impregnated in the heat-insulating thin film. That is, this fuel impregnation increases a fuel loss and reduces the thermal efficiency of the engine, and might cause the air-fuel ratio of the engine to deviate from a set value temporarily so that the combustion deteriorates.

To prevent such problems, inventors of the present invention investigated formation of a heat-insulating film including a silicone-based resin as a main component and including hollow particles on a combustion chamber wall surface of a member facing an engine combustion chamber. Such a heat-insulating film can obtain a high heat insulation property by means of a combination of the silicone-based resin and the hollow particles, and advantageously exhibits high resistance to cracks and peeling because the silicone-based resin absorbs thermal expansion of an engine member (referring to a "member facing an engine combustion chamber," the same holds hereinafter). However, a contact with gasoline fuel injected to the engine combustion chamber might dissolve the silicone-based resin.

To prevent this dissolution, it may be effective to provide a metal plating film on the surface of the heat-insulating layer in order to protect the silicone-based resin against gasoline. However, as disclosed in Japanese Unexamined Patent Publication No. 2009-30151, since no plating metal is deposited on the surface of the silicone-based resin, it is difficult to form a desired plating film.

In addition, in general, since a silicone resin has a low hardness, covering the wall surface of the engine combustion chamber with the silicone resin might deform the heat-insulating layer under the internal pressure of a cylinder from a compression stroke to combustion. The deformation of the heat-insulating layer changes the compression ratio, and thus, significantly affects performance of the engine. Further, the heat-insulating layer is exposed to cycles of the pressure variation for a long period. Accordingly, cracks occur in the heat-insulating layer, and fuel might enter an uncured portion of the film through the cracks.

It is therefore an object of the present invention to solve the difficulty in forming a plating film on a heat-insulating film containing a silicone-based resin as a main component, and provide a heat-insulating layer exhibiting high resistance to cracks, peeling, deformation, and gasoline and a high heat insulation property.

Solution to the Problem

To achieve the above object, according to the present invention, a plating film is formed by allowing a heat-insulating film to include a silicone-based resin as a main component to include a Si-based oxide.

A heat-insulating structure of a member facing an engine combustion chamber presented herein includes: a heat-insulating layer including a silicone-based resin and hollow particles and located on a combustion chamber wall surface of the member facing the engine combustion chamber, wherein the hollow particles contain a Si-based oxide, and a surface of the heat-insulating layer includes a plating film.

In the heat-insulating structure, the hollow particles contain the Si-based oxide, and the plating film is bonded to the body of the heat-insulating layer with the Si-based oxide interposed therebetween. Thus, the problem of difficulty in forming the plating film on the silicone-based resin can be solved. The heat-insulating layer body includes the silicone-based resin having a low thermal conductivity and hollow particles exhibiting air thermal insulation. Thus, desired thermal insulation can be obtained, and a cooling loss of the engine can be reduced advantageously. In addition, the silicone-based resin absorbs thermal expansion of the engine member, and thus, occurrence of cracks and peeling can be avoided advantageously.

In this manner, the plating film protects the silicone-based resin against combustion pressure and fuel. Specifically, the plating film can reduce deformation (deformation of a silicone-based resin portion) of the heat-insulating layer due to combustion pressure. In addition, the plating film also reduces impregnation of fuel in the silicone-based resin and dissolution of the silicone-based resin. Furthermore, the plating film has a specific heat capacity smaller than that of the silicone-based resin. Thus, the surface temperature of the heat-insulating layer can follow a change in gas temperature of the combustion chamber with high responsiveness, i.e., the difference between the surface temperature of the heat-insulating layer and the gas temperature of the combustion chamber easily decrease. As a result, a cooling loss can be reduced. When the temperature of the surface of the heat-insulating layer becomes locally high, this portion might serve as a source of pre-ignition or cause thermal damage of the silicone-based resin. However, since the plating film has a thermal conductivity higher than that of the silicone-based resin and a thermal diffusivity higher than that of the silicone-based resin, the local increase in surface temperature of the heat-insulating layer can be reduced.

In the heat-insulating structure, it is preferable that the heat-insulating layer body under the plating film includes Si-based oxide obtained by partially oxidizing the silicone-based resin and/or the Si-based oxide of the hollow particles, and a metal serving as nuclei for depositing the plating film is supported on the Si-based resin and/or the Si-based oxide derived from the hollow particles.

That is, the Si-based oxide derived from the silicone-based resin and/or the hollow particles is used as a substrate for nuclei for depositing the plating film, thereby ensuring deposition of the plating film.

In the heat-insulating structure, the silicone-based resin may be preferably a silicone-based resin composition including a cage silsesquioxane structure.

In this heat-insulating structure, since the heat-insulating layer is the silicone-based resin composition, in a case where the heat-insulating layer is provided in an engine member of an aluminium alloy, for example, the difference in coefficient of thermal expansion between the heat-insulating layer and the engine member can be reduced. Thus, it is possible to reduce occurrence of peeling, cracks, and other defects in the heat-insulating layer due to the difference in coefficient of thermal expansion. Since the silicone-based resin composition includes the cage silsesquioxane structure, the three-dimensional structure of the cage silsesquioxane structure can obtain a heat-insulating layer that has a low cross-linking density, is not easily deformed, and has a high strength. Thus, deformation due to, for example, combustion pressure can be reduced, occurrence of cracks and peeling in the heat-insulating layer can be reduced, and fuel impregnation can be reduced. Since the heat-insulating layer includes the hollow particles, thermal conductivity of the heat-insulating layer can be further reduced.

In the heat-insulating structure, surfaces of the hollow particles are preferably treated with a silane compound. Then, the silane compound in the surfaces of the hollow particles is cross-linked with the principal chain and the silsesquioxane structure of the silicone-based resin, and the hollow particles can be firmly bonded to the silicone-based resin. Thus, the resulting heat-insulating layer has higher strength.

In the heat-insulating structure, at least one of a chemical conversion treatment layer or an anodized layer is preferably located between a surface of the member facing the engine combustion chamber and the heat-insulating layer. Then, the adhesion between the engine member and the heat-insulating layer can be enhanced.

In the heat-insulating structure, the heat-insulating layer preferably includes 10 wt % or more of the cage silsesquioxane structure. Then, the increase in strength of the heat-insulating layer by the cage silsesquioxane structure can be further enhanced.

In the heat-insulating structure, the cage silsesquioxane structure is preferably treated with ultraviolet ray curing. Then, the heat-insulating layer can be cured without heat. Thus, even in a case where the engine member is made of an aluminum alloy, for example, the cage silsesquioxane structure can be cured without softening the engine member.

In the heat-insulating structure, the heat-insulating layer preferably includes chain siloxane having a fluoroalkyl group. Then, the heat-insulating layer contains chain siloxane including a fluoroalkyl group showing a lipophobic property and oil resistance, and thus, the fuel resistance of the heat-insulating layer can be enhanced.

A method presented herein is a method for producing a heat-insulating structure of a member facing an engine combustion chamber, where the heat-insulating structure includes a heat-insulating layer that includes a silicone-based resin and hollow particles and is located on a combustion chamber wall surface of the member, and the hollow particles contain a Si-based oxide, and the method includes: forming a heat insulator layer including the silicone-based resin and the hollow particles on the combustion chamber wall surface of the member; producing Si-based oxide through oxidation of the silicone-based resin in at least part of a surface of the heat insulator layer by heating the surface of the heat insulator layer; adding a catalytic metal to the Si-based oxide derived from the silicone-based resin in the surface of the heat insulator layer and/or the hollow particles; and depositing a plating metal on the surface of the heat insulator layer by performing electroless plating using the catalytic metal added to the Si-based oxide as nuclei.

In this method, Si-based oxide is produced through oxidation of the silicone-based resin in at least part of the surface of the heat insulator layer by heating the surface of the heat insulator layer. Thus, the Si-based oxide derived from the silicone-based resin and/or Si-based oxide derived from the hollow particles is a substrate of the catalytic metal. In this manner, in electroless plating, the plating metal is deposited on the surface of the heat insulator layer using the catalytic metal as nuclei, and the heat-insulating layer including the plating film in the surface thereof can be obtained.

The method preferably includes etching the surface of the heat insulator layer between the producing the Si-based oxide and the adding the catalytic metal. Roughing of the surface of the heat insulator layer by this etching increases the bonding power of the plating film to the surface of the heat insulator layer, which is advantageous in preventing peeling of the plating film.

In the method, it is preferable that in the adding the catalytic metal, a Pd—Sn complex is attached to the surface of the heat insulator layer, Sn salt is dissolved, and a catalyst of a metal Pd is generated through an oxidation reduction reaction on the surface of the heat insulator layer. Thus, the plating metal is deposited using, as nuclei, the metal Pd supported on the silicone-based resin in the surface of the heat insulator layer and the Si-based oxide derived from the hollow particles.

Regarding the heat-insulating structure, a preferred production method in a case where a silicone-based resin is a silicone-based resin composition including a cage silsesquioxane structure, includes: obtaining a heat insulator by mixing a polysiloxane compound with a cage silicate compound including a cage silsesquioxane structure and hollow particles; and obtaining a heat-insulating layer including a silicone resin composition including the cage silsesquioxane structure and the hollow particles by applying the heat insulator on the combustion chamber wall surface of the member.

In this method, the heat-insulating layer is formed by using the silicone-based resin composition. Thus, in a case where the heat-insulating layer is provided on the engine member of an aluminium alloy, for example, the difference in coefficient of thermal expansion between the heat-insulating layer and the engine member can be reduced. Thus, it is possible to reduce occurrence of peeling, cracks, and other defects in the heat-insulating layer due to the difference in coefficient of thermal expansion. Since the silicone-based resin composition includes the cage silsesquioxane structure, the three-dimensional structure of the cage silsesquioxane structure can obtain a heat-insulating layer that has a low cross-linking density, is not easily deformed, and has a high strength. Thus, deformation due to, for example, combustion pressure can be reduced, occurrence of cracks and peeling in the heat-insulating layer can be reduced, and fuel impregnation can be reduced. Since the heat-insulating layer includes the hollow particles, thermal conductivity of the heat-insulating layer can be further reduced.

In the method, before the mixing the polysiloxane compound with the hollow particles, surfaces of the hollow particles are preferably treated with a silane compound. Then, the silane compound in the surfaces of the hollow particles are cross-linked with the principal chain and the silsesquioxane structure of the silicone-based resin, and the hollow particles can be firmly bonded to the silicone-based resin. Thus, the resulting heat-insulating layer has higher strength.

In the method, the cage silicate compound is preferably added to the polysiloxane compound such that the heat-insulating layer includes 10 wt % or more of the cage silsesquioxane structure. Then, the increase in strength of the heat-insulating layer by the cage silsesquioxane structure can be further enhanced.

Advantages of the Invention

In the heat-insulating structure for the engine combustion chamber of the present invention, the plating film is bonded to the heat-insulating layer body with the Si-based oxide of the hollow particles interposed therebetween. Thus, the silicone-based resin and the hollow particles achieve desired thermal insulation, and occurrence of cracks and peeling can be advantageously reduced. The plating film can reduce deformation of the heat-insulating layer due to combustion pressure, fuel impregnation in the silicone-based resin, dissolution of the silicone-based resin, and a cooling loss, and also reduces pre-ignition of the engine and a heat loss of the silicone-based resin.

In a case where the silicone-based resin is a silicone-based resin composition including a cage silsesquioxane structure, the heat-insulating layer is made of a material having a small difference in coefficient of thermal expansion from the engine member.

Thus, occurrence of cracks and peeling due to the difference in coefficient of thermal expansion between the heat-insulating layer and the engine member can be reduced. In addition, a heat-insulating layer having a high strength and a molecular structure that has a low cross-linking density and is not easily deformed can be obtained, and deformation due to, for example, combustion pressure can be reduced. In addition, occurrence of cracks and peeling in the heat-insulating layer can be reduced, and fuel impregnation is also reduced.

In the method for producing a heat-insulating structure for an engine combustion chamber, a heat insulator layer including the silicone-based resin and hollow particles containing the Si-based oxide is formed on the combustion chamber wall surface of the engine member, the surface of the heat insulator layer is heated such that Si-based oxide is generated through oxidation of the silicone-based resin in at least part of the surface of the heat insulator layer, and then the catalytic metal is added to the surface of the heat insulator layer. Thus, Si-based oxide derived from the silicone-based resin and/or hollow particles serves as a substrate of the catalytic metal. In electroless plating, the plating metal is deposited on the surface of the heat insulator layer using the catalytic metal as nuclei. As a result, the heat-insulating layer including the plating film in the surface thereof can be obtained.

DESCRIPTION OF EMBODIMENTS

Embodiments of the present invention will be described with reference to the drawings. The following embodiments are merely preferred examples in nature, and are not intended to limit the scope, applications, and use of the invention.

<Engine Configuration>

Figure 1:
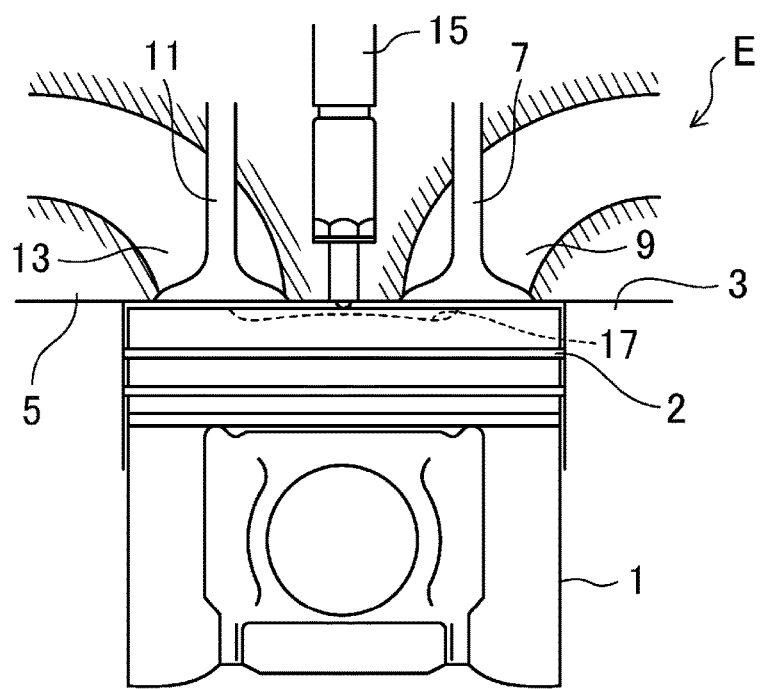
FIG. 1 is a cross-sectional view illustrating a structure of an engine.

In a direct-injection engine E illustrated in FIG. 1, reference character 1 denotes a piston, reference character 3 denotes a cylinder block, reference character 5 denotes a cylinder head, reference character 7 denotes an intake valve that opens and closes an intake port 9 of the cylinder head 5, reference character 11 denotes an exhaust valve that opens and closes an exhaust port 13, and reference character 15 denotes a fuel injection valve. A piston 1 reciprocates in a cylinder bore of the cylinder block 3.

The combustion chamber of the engine is formed by the top face of the piston 1, the cylinder block 3, the cylinder head 5, and front surfaces (surfaces facing the combustion chamber) of umbrella portions of the intake and exhaust valves 7 and 11. A recessed cavity 17 is formed in the top face of the piston 1. In FIG. 1, reference character 2 denotes a piston ring. The spark plug is not shown.

The engine is preferably a lean burn engine having a geometric compression ratio ε of 20 to 50, and driven at an excess air ratio λ, of 2.5 to 6.0 at least a partial load area. Theoretically, the thermal efficiency of the engine is known to increase as the geometric compression ratio increases or the excess air ratio of the operative gas increases. However, in fact, as the compression ratio or the excess air ratio increases, the cooling loss increases, and thus, there is a limitation in improving the thermal efficiency by increasing the compression ratio and the excess air ratio.

Thus, an engine having a high compression ratio and a high excess air ratio is required to reduce the cooling loss significantly, i.e., increase the heat insulation property of the engine in order to obtain a desired thermal efficiency corresponding to the compression ratio ε and the excess air ratio λ. Although not shown, an inter cooler for cooling intake air is provided in the intake system of the above engine. Thus, a gas temperature in the cylinder at the beginning of compression is lowered, and an increase in gas pressure and an increase in gas temperature at the time of combustion are prevented. Thus, the cooling loss can be advantageously reduced (i.e., the indicated thermal efficiency can be improved).

<Heat-Insulating Structure of Engine Member of First Embodiment>

Figure 2:
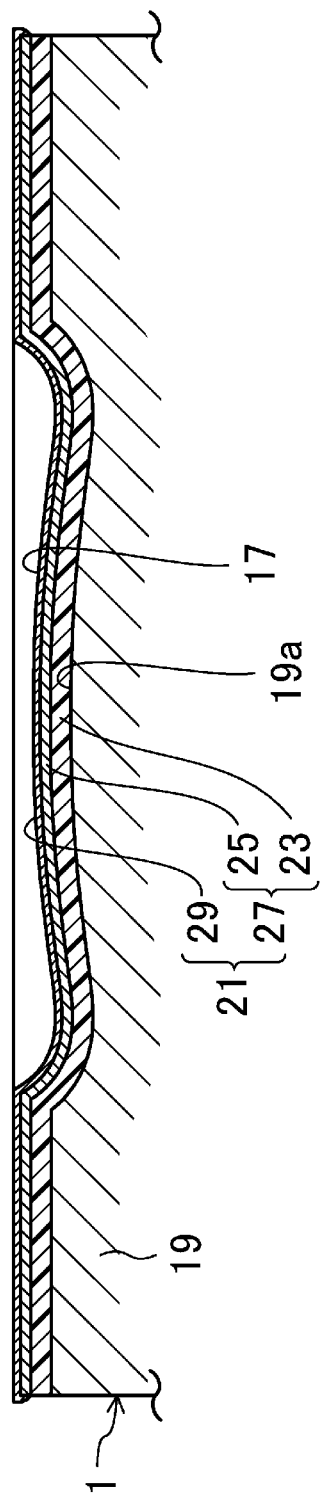
FIG. 2 is an enlarged cross-sectional view illustrating a top portion of a piston of an engine according to a first embodiment.

To enhance heat insulation of the engine, a heat-insulating layer 21 is formed on the top face (i.e., the face facing the engine combustion chamber) of a piston body 19 serving as an engine member, as illustrated in FIG. 2. Although not shown, heat-insulating layers similar to those on the top face of the piston 1 are formed on the surfaces of engine members, i.e., the cylinder block 3, the cylinder head 5, the intake valve 7, and the exhaust valve 11, facing the engine combustion chamber.

The cavity 17 is formed in the center of a top face 19a of the piston body 19. The heat-insulating layer 21 includes a heat-insulating film 27 as a heat-insulating layer body and a plating film 29 covering the entire surface of the heat-insulating film 27. The heat-insulating film 27 includes a base layer 23 having a low thermal conduction and covering the entire top face 19a of the piston body 19 and a surface layer 25 having a high hardness and covering the entire surface of the base layer 23. For convenience of the description, there is a boundary between the base layer 23 and the surface layer 25 in the drawing. However, as will be described later, the surface layer 25 is continuous to the base layer 23 such that the degree of oxidation of a silicone-based resin continuously decreases from the surface toward the inside and there is actually no distinct boundary between the layers 23 and 25. The same holds for FIG. 3.

Figure 3:
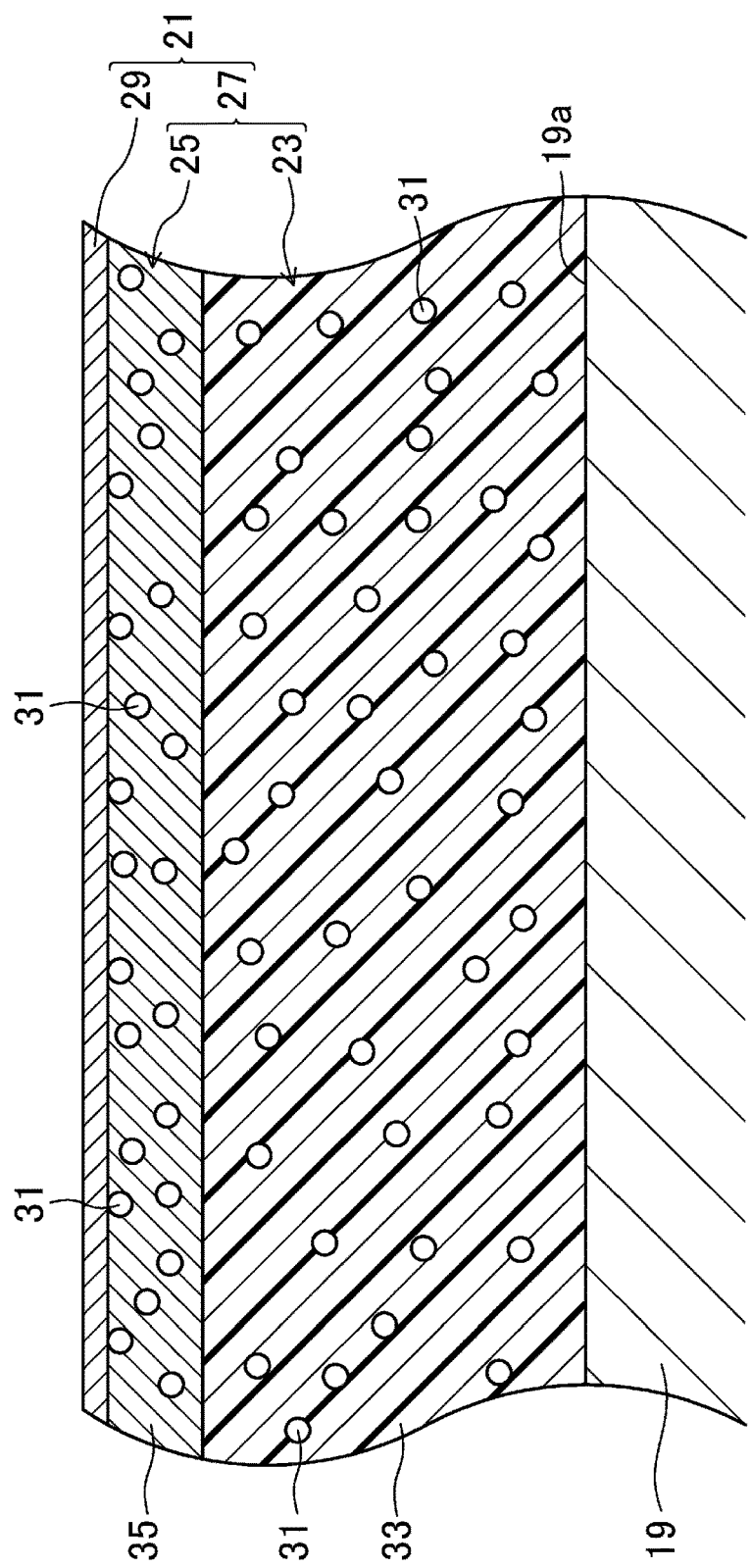
FIG. 3 is an enlarged cross-sectional view illustrating part of the top portion of the piston.

The piston body 19 in this example is made of an aluminum alloy subjected to T7 or T6 treatment. As illustrated in FIG. 3, the heat-insulating film 27 mainly contains a silicone-based resin and includes hollow particles 31 of an inorganic oxide.

Specifically, in the base layer 23 of the heat-insulating film 27, a large number of hollow particles 31 are dispersed in a base material (matrix) 33 of a silicone-based resin having a three-dimensional cross-linked structure. In the base layer 23, the base material 33 is the silicone-based resin 33 having a low thermal conductivity and the presence of the hollow particles 31 allows a large amount of air having a low thermal conductivity to be present. Thus, the base layer 23 has a low thermal conductivity.

On the other hand, in the surface layer 25, although a large number of hollow particles 31 are dispersed in the base material 35 similarly to the base layer 23, the raw material, which is a silicone-based resin, of the base material 35 is partially oxidized, and has become Si-based oxide (e.g., $SiO_2$). In particular, the surface of the base material 35 has a high degree of oxidation of the silicone-based resin and the degree of oxidation decreases toward the base layer 23. As described above, since the base material 35 of the surface layer 25 contains the Si-based oxide as a main component, the surface layer 25 has a high heat resistance and a high hardness. In addition, the presence of the hollow particles 31 achieves a low thermal conductivity.

Preferred examples of the hollow particles 31 of inorganic oxide include ceramic hollow particles containing a Si-based oxide (e.g., $SiO_2$) such as fly ash balloons, shirasu balloons, silica balloons, and aerogel balloons. Materials and particle sizes of the example hollow particles are shown in Table 1.

TABLE 1

| Type of hollow particles | Material | Particle size (μm) |
| --- | --- | --- |
| Fly ash balloon | $SiO_2$, $Al_2O_3$ | 1 to 300 |
| Shirasu balloon | $SiO_2$, $Al_2O_3$ | 5 to 600 |
| Silica balloon | $SiO_2$, $Al_2O_3$ | 0.09 to 0.11 |
| Aerogel balloons | $SiO_2$ | 0.02 to 0.05 |

For example, the chemical compositions of the fly ash balloons are $SiO_2$ (40.1 to 74.4% by mass), $Al_2O_3$ (15.7 to 35.2% by mass), $Fe_2O_3$ (1.4 to 17.5% by mass), MgO (0.2 to 7.4% by mass), CaO (0.3 to 10.1% by mass). The chemical compositions of the shirasu balloons are $SiO_2$ (75 to 77% by mass), $Al_2O_3$ (12 to 14% by mass), $Fe_2O_3$ (1 to 2% by mass), $Na_2O$ (3 to 4% by mass), $K_2O$ (2 to 4% by mass), and IgLoss (2 to 5% by mass). The particle size of the hollow particles 31 is preferably 10 µm or less in average and 50 µm or less at maximum, and the content of the hollow particles 31 is preferably 50% or less in terms of reliability.

Preferred examples of the silicone-based resin include a silicone resin of three-dimensional polymers having a high degree of branching, typified by methyl silicone resin and methyl phenyl silicone resin. Specific examples of the silicone resin include polyalkylphenylsiloxane.

The plating film 29 is a coating whose plating metal is Ni or a Ni-base alloy, and is formed by electroless plating in this embodiment. Specifically, a catalytic metal is supported on Si-based oxide obtained by oxidizing a silicone-based resin in the surface of the surface layer 25 of the heat-insulating film 27, and a catalytic metal is supported on a Si-based oxide of the hollow particles 31 exposed at the surface of the surface layer 25. Using these catalytic metals as nuclei, the plating film 29 is deposited on the surface of the heat-insulating film 27. Accordingly, the plating film 29 is bonded to the heat-insulating film 27 with the Si-based oxide derived from the silicone-based resin and the Si-based oxide derived from the hollow particles 31 interposed therebetween.

As described above, in the heat-insulating layer 21, the base layer 23 containing the silicone-based resin as a main component and having a low thermal conductivity is protected by the plating film 29 having a high heat resistance, a small thermal capacity, and a high thermal conductivity, and the surface layer 25 containing the Si-based oxide as a main component and having a high heat resistance and a high hardness. Thus, even when the heat-insulating layer 21 is exposed to extremely severe heat and pressure environments, the plating film 29 and the surface layer 25 having an increased hardness can reduce deformation or damage of the base layer 23, and high heat insulation property is obtained by means of a combination of the silicone-based resin having a low thermal conductivity and the hollow particles 31 exhibiting air thermal insulation. In addition, the difference in thermal expansion between the plating film 29 or the surface layer 25 and the piston body 19 is absorbed in the low-hardness silicone-based resin of the base layer 23, and thus, occurrence of cracks and peeling can be reduced.

Further, the plating film 29 has a specific heat capacity smaller than that of the silicone-based resin, and thus, the surface temperature of the heat-insulating layer 21 can follow a change in gas temperature of the engine combustion chamber with high responsiveness. Accordingly, the difference between the surface temperature of the heat-insulating layer 21 and the gas temperature of the combustion chamber easily decreases, resulting in a reduction in cooling loss. In addition, since the plating film 29 has a higher thermal conductivity and a higher thermal diffusivity than those of the silicone-based resin, a local increase in surface temperature of the heat-insulating layer 21 can be reduced. Accordingly, pre-ignition of the engine can be avoided, and a heat loss of the silicone-based resin can be reduced.

<Method for Producing Heat-Insulating Structure of Engine Combustion Chamber of First Embodiment>

Figure 4:
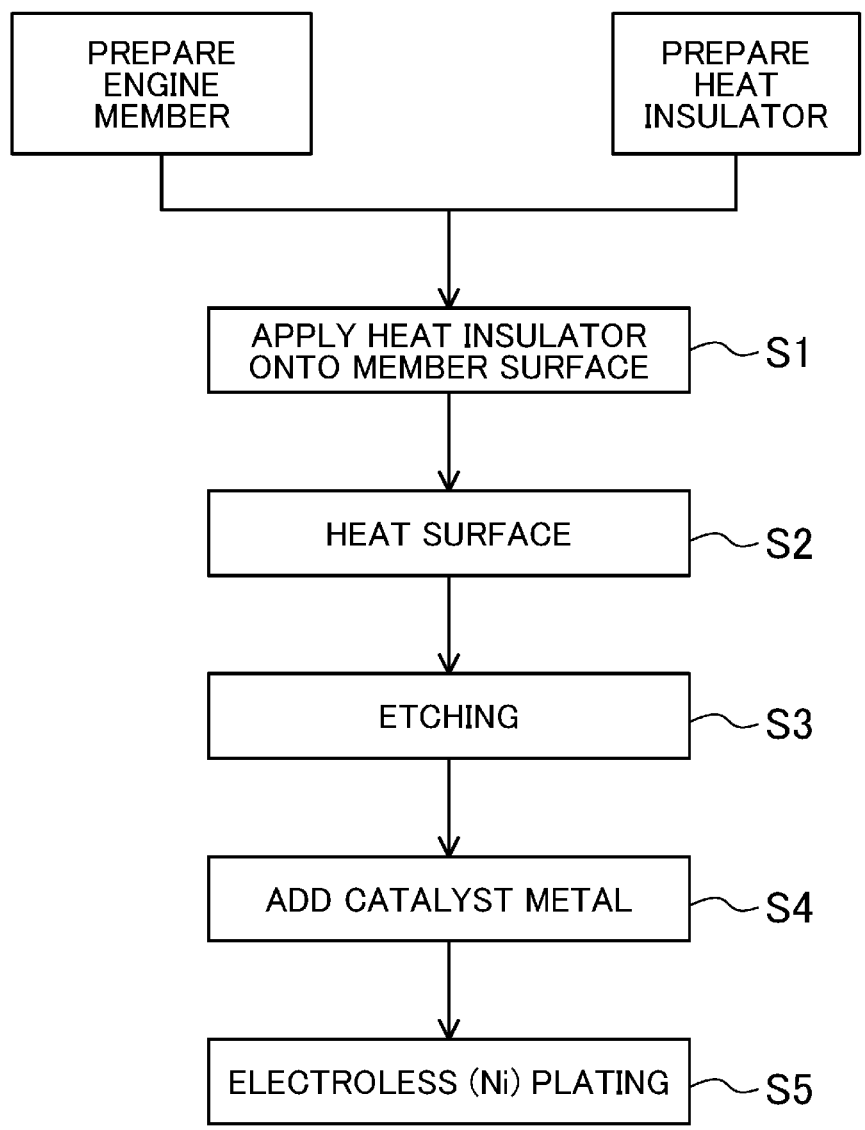
FIG. 4 is a block diagram showing a process of producing a heat-insulating structure of an engine combustion chamber according to the first embodiment.

FIG. 4 is a flow chart showing a method for producing a heat-insulating structure of an engine combustion chamber. In the steps of preparing an engine member and a heat insulator, in the case of preparing an engine member, dirt, such as oils and fats and fingerprints, attached to the surface on which the a heat-insulating layer of the engine member is to be formed is removed by a degreasing process. To enhance adhesion of the engine member to the heat insulator, especially to a silicone-based resin, sand blasting is performed when necessary. In addition, a heat insulator is prepared by stirring and mixing a silicone-based resin and hollow particles. A thickener and/or a dilution solvent are/is added when necessary in order to adjust the viscosity of the heat insulator.

A method for forming the heat-insulating layer 21 on the top face of the piston body 19 will be described below. In other engine members such as a cylinder block, a heat-insulating layer can be formed in a manner similar to that of the piston body 19.

In step S1 (a heat insulator application step), the heat insulator is applied to the top face of the piston body 19 with a spray or a brush. Predrying is performed on the heat insulator layer on the top face of the piston body 19 with hot blast drying or an infrared ray heater, for example. If the thickness of the heat insulator layer does not reach a desired thickness (e.g., 200 µm), the process of application and then predrying is repeated (overcoating) until the thickness of the heat insulator layer reaches the desired thickness. Alternatively, the heat insulator layer may be formed by placing the heat insulator on the top face of the piston body 19, and pushing the heat insulator against the top face of the piston body 19 with a shaping die having a shaping surface in conformity with the shape of the top surface of the piston such that the heat insulator layer is spread over the entire top face.

In step S2 (a surface heating step), the surface of the heat insulator layer is heated to a temperature (e.g., greater than or equal to 300° C. and less than or equal to 400° C.) greater than or equal to the oxidation temperature of the silicone-based resin. In this heating, heat is transmitted from the surface to the inside of the heat insulator layer, a temperature gradient occurs in the heat insulator layer such that the temperature gradually decreases from the surface to the inside. Since the surface of the heat insulator layer is heated to a temperature greater than or equal to the oxidation temperature of the silicone-based resin, the silicone-based resin in the surface is oxidized, and Si-based oxide is generated. That is, a surface layer 25 in which hollow particles 31 are dispersed in a base material 35 containing the Si-based oxide described above and illustrated in FIG. 3 as a main component, is formed at the surface side of the heat-insulating layer 21.

Although this heating facilitates cross-linking of the silicone-based resin in the heat insulator layer, the temperature gradient prevents the temperature from increasing to a degree corresponding to oxidation of the silicone-based resin, and a base layer 23 in which the hollow particles 31 is dispersed in the base material 33 of the above-described silicone-based resin having the three-dimensional cross-linked structure illustrated in FIG. 3 is formed. The base layer 23 is bonded to the piston body 19 with the silicone-based resin having the three-dimensional cross-linked structure interposed therebetween in the course of cross-linking of the silicone-based resin.

In the foregoing manner, a heat-insulating film 27 constituted by the base layer 23 and the surface layer 25 illustrated in FIG. 3 is formed on the top face of the piston body 19.

The surface of the heat insulator layer may be heated in such a manner that the coated surface is directly heated by flames or with an infrared ray heater, for example. In the case of using the shaping die, the shaping die is previously heated with high-frequency induction heating or a heater in the shaping die such that the temperature of the shaping surface increases to a temperature greater than or equal to the oxidation temperature of the silicone-based resin, and the surface of the heat insulator layer is heated by using the shaping surface of the heated shaping die.

To reduce oxidation of the inner silicone-based resin while oxidizing the silicone-based resin in the surface of the insulator layer, the piston body 19 may be cooled by water cooling or air cooling from the inside of the piston skirt. The entire heat insulator layer may be heated to a temperature lower than the oxidation temperature of the silicone-based resin before heating of the surface of the heat insulator layer so that cross-linking of the silicone-based resin can proceed.

In step S3 (an etching step), an unprocessed portion of the piston body 19 except the heat-insulating film 27 is masked by coating with a masking material, and the heat-insulating film 27 is etched. In this embodiment, mixed acid of nitric acid and hydrofluoric acid (nitric acid: 200 mL/L, hydrofluoric acid: 200 mL/L) is used as an etchant. The etching is performed for one minute at room temperature. This etching causes minute projections to be formed on the surface of the heat-insulating film 27.

In step S4 (a catalytic metal adding step), a catalytic metal for electroless plating is added to the surface of the heat-insulating film 27 of the piston body 19. That is, the piston body 19 is immersed in a catalyst solution containing a Pd—Sn complex, and then is subjected to an activation promoting treatment.

In this embodiment, a mixed solution (a Pd—Sn colloidal catalyst) of 50 mL/L of a colloidal acid palladium-tin catalyst solution (CRP catalyst, produced by Okuno Chemical Industries Co., Ltd.) and 250 mL/L of 35% hydrochloric acid is used as a catalyst solution at a bath temperature of 35° C. for an immersion time of 6 minutes. In this manner, the Pd—Sn complex is attached to the Si-based oxide derived from the silicone-based resin in the surface of the heat-insulating film 27 and the Si-based oxide derived from the hollow particles 31.

In the activation process, a mixed solution of 100 mL of concentrated sulfuric acid, 5 g of an accelerator (accelerator X, produced by Okuno Chemical Industries Co., Ltd), and water is used as an activation bath at a bath temperature of 35° C. for an immersion time of 3 minutes. In this manner, tin chloride is dissolved, and an oxidation-reduction reaction causes a catalytic metal of a metal Pd to be generated on the Si-based oxide. That is, the catalytic metal is supported on the Si-based oxide.

In step S5 (an electroless plating step), the piston body 19 in which the catalytic metal is added to the heat-insulating film 27 is rinsed so that surplus sulfuric acid and other substances are removed, and then is immersed in an electroless Ni plating bath. In this embodiment, 250 mL/L of an electroless Ni—P alloy plating solution (Top Nicoron LPH-LF, produced by Okuno Chemical Industries Co., Ltd.) is used. The bath temperature is 90° C., and the immersion time is 12 minutes (in order to obtain a plating film thickness of 3 μm). In the case of this plating bath, the deposition rate of the plating metal is 12 to 18 μm/h. This electroless plating causes an Ni—P alloy to be deposited using the catalytic metal Pd as nuclei, and a plating film 29 is formed on the surface of the heat-insulating film 27. Since the minute projections have been formed by the former etching process on the surface of the heat-insulating film 27, the plating film 29 is firmly fixed to the surface of the heat-insulating film 27 by an anchor effect of the minute projections.

<Heat-Insulating Structure of Engine Combustion Chamber of Second Embodiment>

Similarly to the first embodiment, in a heat-insulating structure of an engine combustion chamber according to a second embodiment, a heat-insulating layer is formed on, for example, the top face of a piston serving as a member constituting the engine combustion chamber. A specific example of this heat-insulating structure will be described with reference to FIG. 5.

Figure 5:
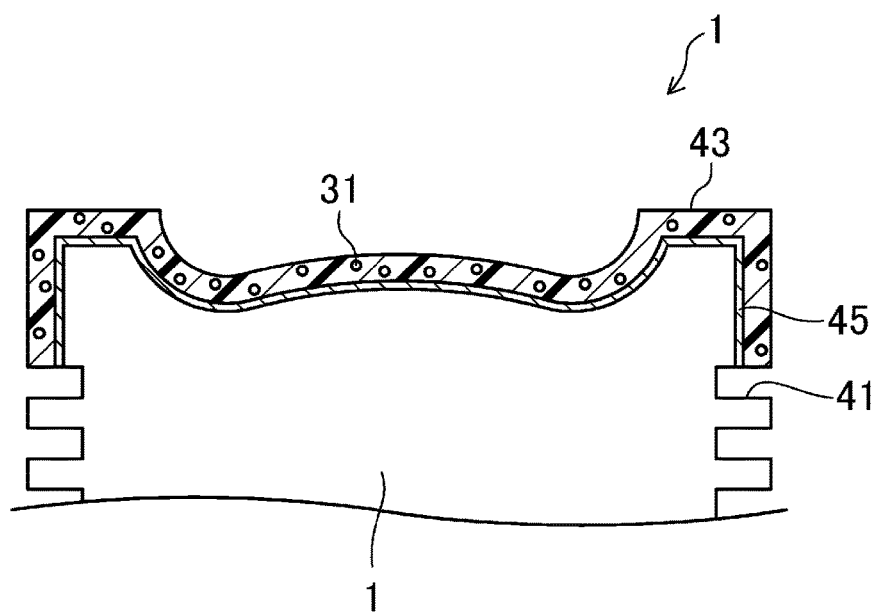
FIG. 5 is an enlarged cross-sectional view illustrating a top portion of a piston of an engine according to a second embodiment.

As illustrated in FIG. 5, a heat-insulating layer 43 including a silicone-based resin composition is formed on the top face of a piston 1 constituting an engine combustion chamber and on a part of the outer peripheral surface of the piston 1 closer to the top face than a piston ring groove 41. The heat-insulating layer 43 includes hollow particles 31 in order to reduce thermal conductivity thereof, and also includes a plating film (not shown) in the surface thereof. The presence of such a heat-insulating layer 43 can reduce a cooling loss in the engine combustion chamber and enhance engine performance.

In a portion where the heat-insulating layer 43 is formed, a chemical conversion treatment layer 45 may be formed between the heat-insulating layer 43 and the surface of the piston body. The chemical conversion treatment layer 45 can be formed by, for example, performing a zirconic acid chemical conversion treatment on the surface of the piston body. In the case of using aluminium as a material for the piston body, the surface of the piston body is subjected to an anodic oxidation coating treatment instead of using the chemical conversion treatment layer 45 so that an anodized layer is formed. These layers can enhance adhesion of the heat-insulating layer 43 to the piston body. Both the chemical conversion treatment layer and the anodized layer may be formed.

In FIG. 5, the engine member is the piston 1. However, the present invention is not limited to this example, of course, and the heat-insulating layer 43 may be provided in another member constituting the engine combustion chamber, such as a cylinder head.

Materials, for example, for the heat-insulating layer of the heat-insulating structure of this embodiment will now be described.

The heat-insulating layer of this embodiment has a feature in including a silicone-based resin composition having a cage silsesquioxane structure and hollow particles.

In this embodiment, the silicone-based resin composition refers to a composition including a highly polymerized compound containing, for example, polysiloxane and polycarbosilane expressed in formulas 1 and 2 below as main components.

[formula 1]

[formula 2]

In formulas 1 and 2, each of $R^1$ and $R^2$ may be one or more substances selected from the group consisting of a hydrogen atom, an alkyl group, an hydroxyl group, an alkoxyl group, an acryloyl group, a glycidyl group, a vinyl group, a halogen atom, an aryl group, and an organic titanium compound or an organic zircon compound.

The heat-insulating layer of this embodiment may include chain siloxane including a fluoroalkyl group. That is, a fluoroalkyl group may be selected as $R^1$ or $R^2$ in the above formulas. The presence of a fluoroalkyl group showing a lipophobic property and oil resistance in the heat-insulating layer can enhance resistance to fuel of the heat-insulating layer.

In this embodiment, the cage silsesquioxane structure refers to a structure to be incorporated in a silicone-based resin by bonding cage silsesquioxane expressed as $[RSiO_{3/2}]_n$ to the silicone-based resin.

A specific example of cage silsesquioxane is expressed as formula 3.

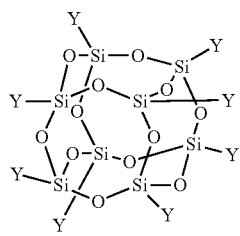

[formula 3]

In formula 3, Y can be selected from the group consisting of, for example, a hydrogen atom, an alkyl group, a hydroxyl group, an alkoxyl group, an acryloyl group, a glycidyl group, and a vinyl group. In addition to these substances, Y may be a functional group expressed as formula 4.

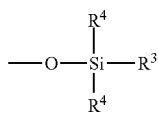

[formula 4]

In formula 4, each of $R^3$ and $R^4$ includes at least one of an alkyl group, a hydroxyl group, an alkoxyl group, or a halogen atom, and may be an organic functional group such as an acryloyl group, a glycidyl group, a vinyl group, a phenyl group, or a trialkylsiloxy group.

In the case of using cage silsesquioxane expressed as formula 3 above, the cage silsesquioxane structure refers to a portion expressed as formula 5, that is, a cage portion expressed as $[SiO_{3/2}]_n$.

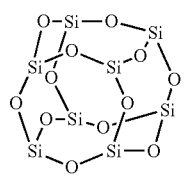

[formula 5]

The use of cage silsesquioxane above enables a covalent bond between the silicone-based resin and cage silsesquioxane, and allows the cage silsesquioxane structure to be incorporated in the silicone resin. Specifically, in a case where both the silicone-based resin and cage silsesquioxane include alkoxyl groups, hydrolysis and condensation polymerization among alkoxyl groups enables the cage silsesquioxane structure to be incorporated in the silicone-based resin. In addition, in a case where the silicone-based resin includes an alkoxyl group and cage silsesquioxane includes an alkyl group, condensation polymerization of these groups enables the cage silsesquioxane structure to be incorporated in the silicone-based resin. The present invention is not limited to these cases, and each of the silicone-based resin and cage silsesquioxane only needs to include a functional group satisfying conditions for polymerizing the silicone resin and cage silsesquioxane.

To promote the polymerization, various catalysts including an acid catalyst or a base catalyst may be used. To promote curing, a curing catalyst such as a salt of aliphatic carboxylic acid may be used. A thermosetting process at about 50° C. to 400° C. for about 10 minutes to 5 hours may be employed. The heat-insulating layer of this embodiment may be subjected to a curing process using ultraviolet (UV) rays. The use of UV can cure the heat-insulating layer without heat. Thus, even in a case where the base material of the engine part is an aluminium alloy, for example, the heat-insulating layer can be cured without softening the base material.

In this manner, the incorporation of the cage silsesquioxane structure in the silicone resin composition can obtain a heat-insulating layer that has a low cross-linking density, is not easily deformed, and has a high hardness of, for example, 5H or more in terms of pencil hardness, because of the three-dimensional structure of the cage silsesquioxane structure.

The above example is directed to the case of using cage silsesquioxane of so-called T8 including eight Si atoms of formula 3. However, the present invention is not limited to this example, and cage silsesquioxane such as T10 or T12 including 10 or 12 Si atoms may be used. In such cases, a cage silsesquioxane structure corresponding to cage silsesquioxane of T10 or T12 is formed.

In this embodiment, the hollow particles are included in the heat-insulating layer in order to reduce thermal conductivity of the heat-insulating layer, and are preferably hollow particles of inorganic oxide. Examples of the hollow particles of inorganic oxide include ceramic hollow particles of, for example, fly ash balloons, shirasu balloons, silica balloons, and aerogel balloons shown in Table 1 and other inorganic hollow particles.

In this embodiment, the surfaces of the hollow particles as described above are preferably treated with a silane compound. The silane compound is a silicon compound that can be bonded to the surfaces of the hollow particles and to a silicone-based resin composition including a cage silsesquioxane structure and is expressed as $X_aSiA_bR^5_{(4-a-b)}$.

In this expression, $R^5$ is, for example, a hydroxyl group, an alkoxyl group, or a halogen atom. The silane compound is bonded to the surfaces of the hollow particles by a reaction between $R^5$ of the silane compound and Si in the surfaces of the hollow particles or metal atoms such as Al or an —OH group. Thus, $R^5$ of the silane compound is not limited to the above-listed substances as long as $R^5$ is, for example, a functional group that can react with the above substances. In addition, A is, for example, a hydrogen atom, an alkyl group, a hydroxyl group, an alkoxyl group, or a halogen atom, and X is an acryloyl group, an alkenyl group, a carboxyl group, a sulfo group, an amino group, or an aryl group. Further, a and b satisfy conditions that a+b is an integer of 1 to 3, a is 0 to 2, and b is an integer of 1 to 3.

EXAMPLES

Examples for specifically describing the heat-insulating structure of a member of an engine combustion chamber according to the present invention will be described. In each example, a silicone-based resin composition including a cage silsesquioxane structure was produced by using a silicone-based resin prepared by using polytinanocarbosilane and methyl phenyl polysiloxane as materials and tetramethyl ammonium-T8-silsesquioxane (produced by GELEST, inc.). On the other hand, as a comparative example, a heat-insulating layer including a silicone-based resin composition including no cage silsesquioxane structure was produced by using no tetramethyl ammonium-T8-silsesquioxane.

Methods for producing heat-insulating layers of examples and the comparative example will be described hereinafter, and the compositions of the heat-insulating layers are shown in Table 2. Although a heat-insulating layer of the present invention includes a plating film in its surface, formation of the plating film is not described in the examples below. The weight percentage of the silsesquioxane structure in Table 2 is shown as a weight percentage of only a cage portion expressed as formula 5 in the resin component of the deposited film. Regarding the silicone-based resin composition and the hollow particles, the weight percentages in a paint solid content (except a solvent) are shown.

formula 6. In formula 6, Y is a functional group expressed as formula 7. In formula 7, $R^6$ is hydrogen and $R^7$ is a methyl group. The amount of the cage silicate compound is determined in order to include 10 wt % of a cage silsesquioxane structure in a resin component of a heat-insulating layer after deposition, as shown in Table 1.

[formula 6]

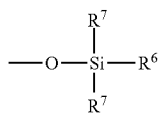

TABLE 2

|  |  |  | Example | | | | | | | Comparative Example |
|---|---|---|---|---|---|---|---|---|---|---|
|  |  |  | 1 | 2 | 3 | 4 | 5 | 6 | | 1 |
| Base Material | Metal | | Al | Al | Al | Al | Al | Al | | Al |
|  | Plate Thickness | | 3 mm | 3 mm | 3 mm | 3 mm | 3 mm | 3 mm | | 3 mm |
| Pretreatment | Film to be Coated | C-A | — | ○ | — | — | — | — | | — |
|  |  | C-B | — | — | ○ | — | — | — | | — |
| Heat-insulating Layer | Silicone-based Resin Composition (In Paint Solid Content) | A | 40 Parts | 40 Parts | 40 Parts | 40 Parts | 38 Parts | 38 Parts | | 47 Parts |
|  |  | B | 45 Parts | 45 Parts | 45 Parts | 45 Parts | 43 Parts | 43 Parts | | 53 Parts |
|  |  | C | 15 Parts | 15 Parts | 15 Parts | 15 Parts | — | 14 Parts | | — |
|  |  | D | — | — | — | — | 19 Parts | — | | — |
|  |  | E | — | — | — | — | — | 5 Parts | | — |
|  | Hollow Particles (In Paint Solid Content) | P-1 | 100 Parts | 100 Parts | 100 Parts | — | 100 Parts | 100 Parts | | 100 Parts |
|  |  | P-2 | — | — | — | 100 Parts | — | — | | — |
|  | Weight Percentage of Cage Silsesquioxane Structure (In Deposited Resin Component) |  | 10% | 10% | 10% | 10% | 10% | 10% | | 0% |
| Evaluation | Initial Appearance |  | ○ | ○ | ○ | ○ | ○ | ○ | | ○ |
|  | Oil Resistance |  | ○ | ○ | ○ | ○ | ○ | ○ | | X |

[Composition]
C-A: Anodic oxide coating treatment
C-B: Zirconic acid chemical conversion treatment
A: Polytinanocarbosilane
B: Methyl phenyl polysiloxane
C: White crystal composite of Examples 1-3 (expressed in formula below)
D: Tetramethyl ammonium-T8-silsesquioxane (produced by GELEST. inc.)
E: Trifluoro propyl trimethoxysilane (produced by Shin-Etsu Chemical Co., Ltd.)
P-1: Super Baloon 732C (produced by Showa Chemical Industry Co., Ltd.)
P-2: Super Baloon 732C treated with silane compound Example 1

First, 12.8 g of tetramethyldisiloxane, 150 g of toluene, and 10 g of methanol were placed in a 3-neck glass flask provided with a stirrer and a thermometer and were mixed together. The resulting mixture solution was cooled to 5° C., and while the mixture solution was being stirred, 17.4 g of 69% nitric acid was dropped into the mixture solution in small portions. Thereafter, the mixture solution was returned to room temperature, and while the mixture solution was being stirred, a solution in which 50.0 g of a cage silicate compound (tetramethyl ammonium-T8-silsesquioxane: SIO6696.9 produced by GELEST, inc.) was dissolved in 50.0 g of methanol was dropped for one hour. The mixture solution was stirred for four hours at room temperature, and then an aqueous layer was separated, and an organic layer was washed three times with 100 g of water. Then, the organic layer was subjected to evaporation to dryness, thereby obtaining white crystal of a compound expressed as -continued

[formula 7]

$$-O-\underset{R^7}{\overset{R^7}{\underset{|}{Si}}}-R^6$$

Then, a reaction vessel provided with a stirrer, a thermometer, and a cooling pipe was supplied with 70.0 g of a xylene/1-butanol solution (Tyranno coat: VN-100 produced by Ube Industries, Ltd.) in which the concentration of a mixture of polytinanocarbosilane (47.4 wt %) and methyl phenyl polysiloxane (52.6 wt %) as a polysiloxane compound was 45.7 wt %, and also supplied with 5.6 g of the white crystal, 7.5 g of 1-butanol, and 37.6 g of hollow particles (Super Baloon 732C, produced by Showa Chemical Industry Co., Ltd.). These materials were stirred at room temperature for 24 hours and, thereby, were uniformly dispersed. In this manner, a paint serving as a heat insulator of Example 1 was obtained.

Next, an aluminium plate having a planar surface size of 40 mm×40 mm and a thickness of 3 mm is degreased with thinner, and then the entire surface to be coated was grinded five times in one direction with 320-grit sandpaper, thereby cleaning the surface. Thereafter, the cleaned surface of the aluminium plate was entirely coated with the paint with a spray (W-101, produced by ANEST IWATA Corporation). The coated aluminium plate was allowed to stand at room temperature for three minutes, and then was coated with the paint again. This coating was additionally performed twice. The aluminium plate whose coating had been completed was allowed to stand for 30 minutes.

Subsequently, the coated surface of the aluminium plate was dried at 80° C. for 10 minutes with a hot blast dryer (DK-400, produced by Yamato Scientific Co., Ltd.). Thereafter, with the same hot blast dryer, the coated surface of the aluminium plate was treated at 180° C. for 30 minutes, thereby fixing and curing the coating. In the foregoing manner, a heat-insulating layer of Example 1 was formed on the surface of the aluminium plate. The thickness of the heat-insulating layer was 0.16 mm.

Example 2

Example 2 is the same as Example 1 in the composition of the heat-insulating layer itself, and differs from Example 1 only in that the surface of the aluminium plate to be coated was subjected to an anodic oxide coating treatment. Thus, the following description is directed only to the anodic oxide coating treatment, and description of the other treatments will not be repeated.

In the anodic oxide coating treatment, an aluminium plate as a material to be coated is placed in an electrolytic bath of a 15% (w/v) sulfuric acid aqueous solution having a dissolved aluminium concentration of less than or equal to 5 g/L and was treated at a bath temperature of 20° C. to 25° C., a current density of 60 A/m$^2$ to 130 A/m$^2$, a bath voltage of 16 V for two minutes. The thickness of the oxidation coating after the anodic oxide coating treatment was 1.5 µm.

Example 3

Example 3 is the same as Example 1 in the composition of the heat-insulating layer itself, and differs from Example 1 only in that the surface of the aluminium plate to be coated was subjected to a zirconic acid chemical conversion treatment. Thus, the following description is directed only to the chemical conversion treatment, and description of the other treatments will not be repeated.

First, a chemical conversion treatment agent in which the concentration of zirconium was 500 ppm, the concentration of fluorine was 420 ppm, the concentration of alkoxysilane including an amino group as a solid content was 200 ppm, and the concentration of alkoxysilane including a hydroxy group was 50 ppm was prepared by using zirconium nitrate (produced by Nippon Light Metal Company, Ltd), hydrogen fluoride (produced by Wako Pure Chemical Industries, Ltd.), N-2(aminoethyl)3-aminopropyl trimethoxysilane (KBM-603, produced by Shin-Etsu Chemical Co., Ltd.), and bis (2-hydroxyethyl)-3-aminopropyl triethoxysilane (SIB 1140.0, produced by GELEST, inc.). Using aqueous sodium hydroxide, the pH of the chemical conversion treatment agent was adjusted to 2.8. The temperature of the chemical conversion treatment agent was adjusted to 40° C., and then an aluminium plate as a material to be coated was immersed in the chemical conversion treatment agent for 60 seconds. In this manner, the aluminium plate subjected to the chemical conversion treatment was spray rinsed with tap water for 30 seconds. Subsequently, the aluminium plate was spray rinsed with ion-exchanged water for 10 seconds.

Example 4

Example 4 differs from Example 1 only in hollow particles, and employs hollow particles subjected to a silane compound treatment. Thus, the following description is directed only to the silane compound treatment on hollow particles, and description of the other treatments will not be repeated.

First, 70 parts by weight of isopropanol, 30 parts by weight of hollow particles (Super Baloon 732C, produced by Showa Chemical Industry Co., Ltd.), and 7 parts by weight of 3-methacryloxy propyl trimethoxysilane (SZ-6030, produced by Dow Corning Toray Silicone Co., Ltd.) as a silane compound were placed in a reaction vessel provided with a stirrer, a thermometer, and a cooling pipe, and were gradually heated while being stirred. After the temperature of the reaction solution had reached 68° C., the reaction solution was further heated for 5 hours. Thereafter, the solution was subjected to vacuum concentration while being stirred, thereby performing a silane compound treatment on the surfaces of the hollow particles.

Example 5

Example 5 differs from Example 1 only in a method for providing a cage silsesquioxane structure in a silicone-based resin. Thus, the following description is directed only to treatments different from those of Example 1, and description of the other treatments will not be repeated.

First, a reaction vessel provided with a stirrer, a thermometer, and a cooling pipe was supplied with 70.0 g of a xylene/1-butanol solution in which the concentration of a mixture of polytinanocarbosilane (47.4 wt %) and methyl phenyl polysiloxane (52.6 wt %) was 45.7 wt %, and was cooled to 5° C. Then, while the mixture solution was being stirred, 17.4 g of 69% nitric acid was dropped therein in small portions. Thereafter, the mixture solution was returned to room temperature, and while the mixture solution was being stirred, a solution in which 7.5 g of tetramethyl ammonium-T8-silsesquioxane (SIO6696.0, produced by GELEST, inc.) was dissolved in 7.5 g of 1-butanol was dropped for one hour. The solution was then stirred for four hours at room temperature, and then, an aqueous layer was removed by separation. Thereafter, 39.6 g of hollow particles (Super Baloon 732C, produced by Showa Chemical Industry Co., Ltd.) were placed in the vessel, and were stirred at room temperature for 24 hours so that the particles were uniformly dispersed. In this manner, a paint as a heat insulator of Example 5 was obtained. Subsequent coating on an aluminium plate was similar to that of Example 1. The thickness of the heat-insulating layer obtained in Example 5 was 0.18 mm Example 6

Example 6 differs from Example 1 only in that chain siloxane including a fluoroalkyl group is added to the silicone-based resin composition. Thus, the following description is directed only to treatments different from those of Example 1, and description of the other treatments will not be repeated.

First, with the same method as in Example 1, white crystal expressed as formula 6 including a cage silicate compound (SIO6696.9: tetramethyl ammonium-T8-silsesquioxane produced by GELEST, inc.) was obtained.

Next, a reaction vessel provided with a stirrer, a thermometer, and a cooling pipe was supplied with 70.0 g of a xylene/1-butanol solution (Tyranno coat: VN-100 produced by Ube Industries, Ltd.) in which the concentration of a mixture of polytinanocarbosilane (47.4 wt %) and methyl phenyl polysiloxane (52.6 wt %) was 45.7 wt %, and also supplied with 5.6 g of the white crystal, 7.5 g of 1-butanol, and 37.6 g of hollow particles (Super Baloon 732C, produced by Showa Chemical Industry Co., Ltd.) and 2.0 g of trifluoro propyl trimethoxysilane (produced by Shin-Etsu Chemical Co., Ltd.) as chain siloxane including a fluoroalkyl group. These materials were stirred at room temperature for 24 hours and, thereby, were uniformly dispersed. In this manner, a paint serving as a heat insulator of Example 6 was obtained. Subsequent coating on an aluminium plate was similar to that of Example 1. The thickness of the heat-insulating layer obtained in Example 6 was 0.17 mm Comparative Example 1

Unlike Examples 1-6, in Comparative Example 1, no cage silicate compound was added to a silicone-based resin.

Specifically, a reaction vessel provided with a stirrer, a thermometer, and a cooling pipe was supplied with 70.0 g of a xylene/1-butanol solution (Tyranno coat: VN-100 produced by Ube Industries, Ltd.) in which the concentration of a mixture of polytinanocarbosilane (47.4 wt %) and methyl phenyl polysiloxane (52.6 wt %) was 45.7 wt %, and also supplied with 7.5 g of 1-butanol and 32.0 g of hollow particles (Super Baloon 732C, produced by Showa Chemical Industry Co., Ltd.) not subjected to a silane compound treatment. These materials were stirred at room temperature for 24 hours and, thereby, were uniformly dispersed. In this manner, a paint serving as a heat insulator of Comparative Example 1 was obtained. Subsequent coating on an aluminium plate was similar to that of Example 1. The thickness of the heat-insulating layer obtained in Comparative Example 1 was 0.14 mm.

The initial appearances and oil resistances of the thus-obtained heat-insulating layers of Examples 1-6 and Comparative Example 1 were evaluated.

Specifically, with respect to the initial appearance, the background color was an achromatic color of about N5 in accordance with JIS Z 8721, frosted glass transmitted light or diffused daylight from a light source except a fluorescent lamp was used, a uniform illuminance of 300 lx or more was applied to an effective area, and the appearances of the heat-insulating layers were visually observed from a distance of about 0.5 m so that the presence of each of base surface exposure, bulging, peeling, cracks, transparency, repellency, pinholes, and orange peel is detected. As a result, as shown in Table, 2, no defects were observed in any of the heat-insulating layers.

In an oil resistance test, the heat-insulating layers were immersed in synthetic gasoline at room temperature for 60 minutes, and then a change in thickness and the presence of dissolution of each of the heat-insulating layers were detected. As a result, as shown in Table 2, the change in thickness and dissolution were not observed in the heat-insulating layers of Examples 1-6. On the other hand, the change in thickness and dissolution were observed in the heat-insulating layer of Comparative Example 1. These results suggest the presence of the cage silsesquioxane structure in the silicone-based resin of the heat-insulating layer can enhance oil resistance.

Other Embodiments

The present invention is not limited to the above embodiments, and may be in various forms without departing from the spirit and major features of the invention.

In the above embodiments, the silicone-based resin was a silicone resin such as polyalkylphenylsiloxane, for example, but may be any resin at least partially including a skeleton of a siloxane bond.

The foregoing embodiments are merely illustrative in every aspect and should not be construed restrictively. All of modifications and changes falling within the scope of equivalence of the appended claims are also intended to be within the scope of the invention.

DESCRIPTION OF REFERENCE CHARACTERS 1 piston
3 cylinder block (engine member)
5 cylinder head (engine member)
7 intake valve (engine member)
11 exhaust valve (engine member)
19 piston body (engine member)
19a top face
21 heat-insulating layer
23 base layer
25 surface layer
27 heat-insulating film
29 plating film
31 hollow particles
33 base material (silicone-based resin) of base layer
35 base material including Si-based oxide of surface layer
43 heat-insulating layer
E engine

The invention claimed is:

1. A heat-insulating structure of a member facing an engine combustion chamber, the heat-insulating structure comprising:
a heat-insulating layer including a silicone-based resin and hollow particles and located on a combustion chamber wall surface of the member facing the engine combustion chamber, wherein
the hollow particles contain a Si-based oxide,
the heat-insulating layer includes a base layer in which the hollow particles are dispersed in a base material of the silicone-based resin and also includes a surface layer containing $SiO_2$ or a plating film on the base layer, and
the silicone-based resin has a three-dimensional structure, wherein
the silicone-based resin is a silicone-based resin composition including a cage silsesquioxane structure.

2. The heat-insulating structure of claim 1, wherein surfaces of the hollow particles are treated with a silane compound.

3. The heat-insulating structure of claim 2, wherein at least one of a chemical conversion treatment layer or an anodized layer is located between a surface of the member facing the engine combustion chamber and the heat-insulating layer.

4. The heat-insulating structure of claim 1, wherein
the heat-insulating layer includes 10 wt % or more of the cage silsesquioxane structure.

5. The heat-insulating structure of claim 1, wherein
the cage silsesquioxane structure is treated with ultraviolet ray curing.

6. The heat-insulating structure of claim 4, wherein
the cage silsesquioxane structure is treated with ultraviolet ray curing.

7. The heat-insulating structure of claim 1, wherein
the heat-insulating layer includes chain siloxane having a fluoroalkyl group.

8. A method for producing a heat-insulating structure of a member facing an engine combustion chamber, the heat-insulating structure including a heat-insulating layer that includes a silicone-based resin and hollow particles and is located on a combustion chamber wall surface of the member, the method comprising:

obtaining a heat insulator by mixing a polysiloxane compound with a cage silicate compound including a cage silsesquioxane structure and hollow particles; and obtaining a heat-insulating layer including a silicone resin composition including the cage silsesquioxane structure and the hollow particles by applying the heat insulator on the combustion chamber wall surface of the member.

9. The method of claim 8, wherein
before the mixing the polysiloxane compound with the hollow particles, surfaces of the hollow particles are treated with a silane compound.

10. The method of claim 8, wherein
the cage silicate compound is added to the polysiloxane compound such that the heat-insulating layer includes 10 wt % or more of the cage silsesquioxane structure.

11. The method of claim 8, wherein
the hollow particles have a volume that is less than half of a total volume of the heat insulating layer.

* * * * *